Figure 1:
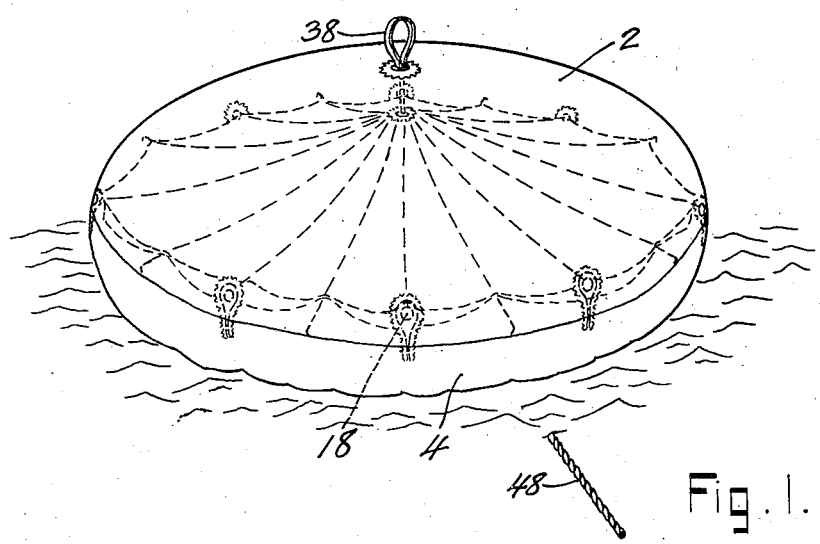

Dec. 10, 1946.    W. H. MILLER, JR    2,412,466

INFLATABLE FLOATING SOLAR STILL WITH CAPILLARY FEED

Filed Dec. 24, 1943

INVENTOR.
WILLIAM H. MILLER, JR.
BY
Albert Sperry.
ATTORNEY

Patented Dec. 10, 1946

2,412,466

UNITED STATES PATENT OFFICE 2,412,466

INFLATABLE FLOATING SOLAR STILL WITH CAPILLARY FEED

William H. Miller, Jr., South Orange, N. J., assignor to Gallowhur Chemical Corporation, a corporation of Vermont Application December 24, 1943, Serial No. 515,601

2 Claims. (Cl. 202—234)

My invention relates to solar distillation apparatus and particularly to apparatus of a floating type embodying an inflatable chamber to which the liquid to be distilled is fed by capillary attraction.

Several types of solar distillation apparatus have been developed for use in recovering fresh water from sea water and the constructions shown and described in the application of William R. P. Delano, Serial No. 465,366, filed November 12, 1942, and others, have proved particularly satisfactory for use as emergency equipment for lifeboats, life-rafts, inflatable boats for aircraft and the like. However, all apparatus of this type heretofore produced has required the use of rigid supporting elements or framework to hold the structure extended. Certain floating or inflatable constructions have also been suggested but these also have embodied rigid frame elements or separate inflated supports which render the apparatus complicated and expensive to construct and troublesome to use. Furthermore, the presence of such frame elements or supplementary supports materially increases the space which the apparatus occupies when folded, whereas one of the most important requirements of such apparatus is that it shall be capable of being collapsed into the smallest possible volume.

In accordance with my invention these objections to constructions of the prior art are overcome and novel solar distillation apparatus provided wherein no rigid framework whatever is required and a structure capable of producing a pint of pure water from sea water may be folded into a volume of less than 50 cubic inches. My invention further is characterized by its simplicity and economy of construction and by the provision of means whereby the apparatus may be fed with liquid by means of capillary attraction operating against the pressure of the air with which the apparatus is inflated. Another novel feature of my invention resides in the construction and arrangement of the elements for collecting distilled water whereby they may be manipulated easily and without danger of spilling the water obtained.

One of the objects of my invention is to provide novel solar distillation apparatus of a floating type embodying a single inflated chamber.

Another object of my invention is to provide solar distillation apparatus which is extremely light in weight and collapsible or foldable into a very small space.

A particular object of my invention is to provide inflatable solar distillation apparatus wherein liquid is fed into the apparatus by capillary attraction against the pressure of air used to inflate the apparatus.

These and other objects and features of my invention will appear from the following description thereof in which reference is made to the figures of the accompanying drawing.

Figure 3:
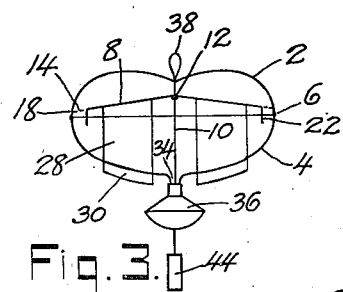
Figure 4:
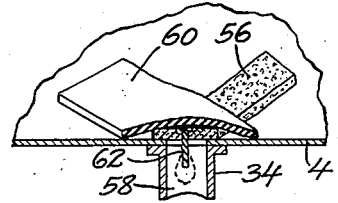
Figure 2:
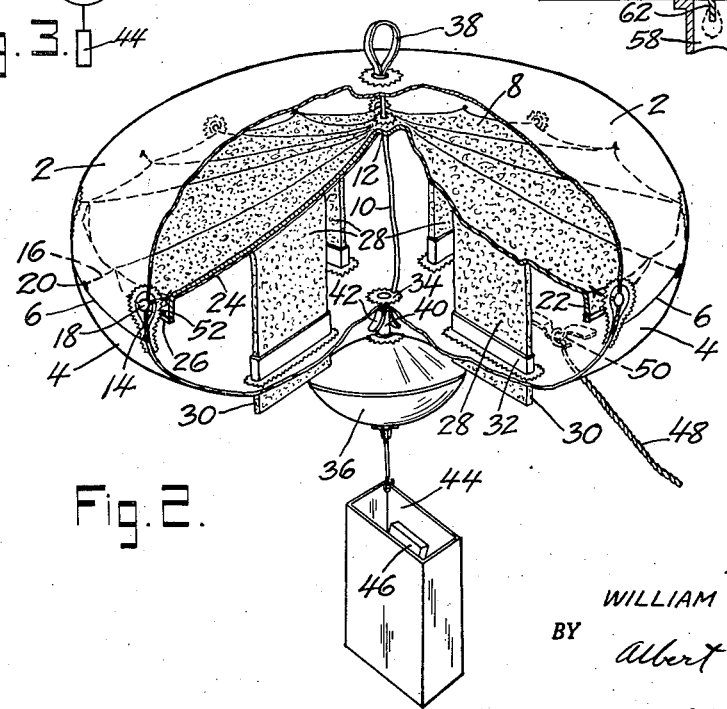

In the drawing:

Fig. 1 is a perspective of one typical form of apparatus embodying my invention, Fig. 2 is a view similar to Fig. 1 with parts of the apparatus broken away to illustrate the construction more clearly, Fig. 3 is a diagrammatic sectional view through the construction shown in Figs. 1 and 2, and Fig. 4 is a perspective of an alternative detail of construction with parts broken away.

In that form of my invention chosen for purposes of illustration in the figures of the drawing, the apparatus embodies an envelope formed of flexible material that is resistant to the action of sea water. At least the upper portion of the envelope is transparent to solar radiations and as shown in the drawing the envelope may conveniently be formed of two circular sections of material, the upper section being shown at 2 and secured at its edges to the edges of a similar lower section 4 along a seam 6.

The sections 2 and 4 may be formed of any suitable material such as vinyl resin sheets, the material actually used being known as "Vinylite V. U. 1900." However, any other flexible and transparent material may be employed and both of the sections 2 and 4 may be transparent if desired. By using resinous or other material which is thermo-plastic or capable of being bonded together by heat sealing, gluing or similar operations, the seam 6 may be made air tight very readily in forming the seam. If the materials are stitched at the seam 6 or elsewhere, the stitches should be sealed by an adhesive, cement or an overlying strip of material which may serve also to reinforce the seam.

Within the envelope is an evaporator pad 8 which is formed of water retaining material such as fabric, felt, wicking or the like. In practice the material used is terry cloth and this or any other form of evaporator pad is preferably colored black to insure the maximum absorption of solar radiation reaching the pad through the envelope. The pad thus may be colored black with any permanent, water insoluble and non-toxic dye, pigment or the like.

The pad 8 is supported within the envelope 2 by any suitable means which serve to hold it out of contact with the inner surfaces of the envelope when the envelope is inflated. As shown, a cord 10 is connected to the upper section 2 of the envelope near the center thereof and is attached to the pad 8 at the point 12 to support the middle of the pad. Strings 14 and 16 are connected to the evaporator pad 8 and extend from points near the edges of the pad to the inner surface of the envelope. The strings 14 are connected to the upper section of the envelope at the points 18 above the seam 6 and cooperate with the central support 12 on the cord 10 to maintain the evaporator pad spread and sufficiently taut to support the pad in an extended position even when saturated with sea water. The intermediate strings 16 are connected to the pad at points between the main supporting strings 14 and extend to the inner surface of the envelope at points 20 along the seam 6 to aid in spreading and supporting the pad and to prevent such sagging of the pad between the supporting strings that gutters might be formed into which an excess of sea water might drain from other portions of the pad.

The marginal edges 22 of the pad preferably hang downward between the strings 14 and 16 and are slotted so that the intervening portions will hang vertically in order that the pad will present the maximum surface for receiving radiation from the sun even when the sun is near the horizon.

The evaporator pad 8 preferably is provided with reinforcing strips 24 which extend along the lower surface thereof from the points where supporting strings 14 are attached toward the center support 12. The pad 8 may also be bound along its edges as at 26 to prevent it from absorbing fresh water from the inner surface of the envelope in the event the downwardly extending portions 22 should swing outward and contact the envelope as the apparatus tilts and bobs about in rough water. The binding of the edges also precludes dripping of salt water from the pad as the apparatus tilts. Ordinarily, however, the strings 14 and the central support 12 on the cord 10 serve to hold the pad above the level of the water in which the apparatus floats and since the pad is supplied with sea water to be distilled by capillary attraction the pad does not receive sufficient sea water to cause it to drip from the pad under any ordinary circumstances.

Sea water is supplied to the evaporator pad 8 by wicks 28 which are attached to the lower surface of the evaporator pad and extend downwardly through said slots in the lower section 4 of the envelope. These wicks project below the envelope to provide portions 30 which are immersed in the sea water upon which apparatus floats when in use. Any number of wicks 28 may be employed and they may be formed of material the same as, or different from, the evaporator pad. The material used in actual practice is a felt like cotton fiber product sold under the trade name "Masslin" and it also is dyed black to absorb heat as it conducts water upwardly by capillary attraction to the evaporator pad 8.

In order to prevent the escape of air from the envelope after inflation thereof and in order to prevent leakage of salt water into the envelope to contaminate the fresh water obtained, collars 32 are secured to the lower section 4 of the envelope about the slots through which the wicking 28 passes. These collars extend upward about the wicking to any desired height and they are stitched to the wicking both above and below the section 4. This stitching is made sufficiently loose to form only a slight restriction in the wick 28 which will be insufficient to prevent ready flow of liquid upward by capillary attraction from the projections 30 to the evaporator pad 8 but sufficient to prevent the escape of air through the slot in the section 4 and along the surface of the wicking. It is found in practice that such restriction may be controlled so that the escape of air from the inflated envelope is prevented while capillary feed of liquid to the pad is adequate to maintain the evaporator pad continually moistened with sea water. The feed of sea water to the apparatus is thus accomplished by capillary attraction against the pressure of the air with which the envelope is inflated.

The lower section of the envelope is also provided with a discharge nipple 34 having a central opening 58 therein through which pure water passes to a collector 36. The nipple is attached to the center of the section 4 in position to be located at the lowest point in the envelope when the envelope is inflated.

The cord 10 which carries the central support for the pad is also attached to the lower section 4 about the nipple 34 and serves to limit expansion of the envelope vertically upon inflation thereof. The cord 10 thus cooperates with strings 14 and 16 attached to the evaporator pad and the walls of the envelope to restrict expansion and define the shape of the envelope on inflation thereof so that the envelope will assume a flattened or biscuit-like shape with the nipple 34 in the center of the bottom of the apparatus. The cord 10 preferably also is extended through the upper section 2 of the envelope to form a lifting loop 38 by which the apparatus may be lifted from the sea water to remove the collector 36 from the nipple 34.

The collector 36 is preferably formed of flexible material, such as that used in forming the envelope itself. It is provided with an upper neck 40 for attachment to the projecting tubular portion of the nipple 34. The connection between the collector and nipple should be water tight to prevent contamination of the pure water obtained from the apparatus by sea water leaking in at the joint between the collector and nipple. As illustrated in the drawing the connection includes a spring clip 42, but in practice screw threads and elastic slip connections have also been used. With any of these connections the removal and application of the reservoir is very simple and may be effected with one hand while holding the apparatus by the lifting loop 38 with the other hand.

The collector may also be formed with a connection on the bottom thereof to which a sea anchor or steadying weight 44 may be connected. As shown, this sea anchor is in reality the container in which the apparatus is packed and shipped and is in the form of a metal box having a cover 46 which may be placed in the box to increase its weight when employed as the sea anchor.

The apparatus also is provided with a towing line 48 which may be attached at 50 to the lower section 4 of the envelope or to any other convenient portion of the apparatus so that it may be allowed to float on the water without drifting away from the life-boat, raft or other vessel with which it is used.

In using the apparatus described the envelope is removed from the container in which it is packed and is inflated by simply blowing into the nipple 34 as one would blow up a balloon. The collector 36 is then attached to the nipple 34 and the sea anchor is connected to the collector. The apparatus is then placed on the water and allowed to drift at the end of the tow line 48.

In placing the apparatus in the water the projections 30 of the wicks 28 are submerged in the sea water and immediately become saturated. They then draw sea water upward by capillary attraction through the slots in the lower section 4 of the envelope and past the stitching which prevents the escape of air from the envelope. The sea water continues to rise in wicks 28 and flows out through the evaporator pad 8 until the pad itself is thoroughly wet and substantially saturated with sea water. Thereafter the wicks only feed additional sea water to the evaporator pad in amounts sufficient to maintain it continually moistened.

Solar radiation passing through the transparent upper section 2 of the envelope falls on the evaporator pad and heats the pad and the sea water carried thereby causing pure water to evaporate therefrom. The black color of the pad serves to increase the absorption of heat and solar radiation by the pad and thus aids in effecting evaporation of pure water from the sea water.

The water vapors thus produced saturate the air within the envelope and since the upper walls of the envelope are transparent and do not absorb appreciable amounts of heat from the sun, they remain at a lower temperature than the evaporator pad and accordingly the moisture from the saturated air condenses on these walls and runs down into the lower portion of the envelope. Moreover, the lower portion of the envelope is shaded from the sun by the evaporator pad and is continuously cooled by the water upon which the apparatus floats. Thus the lower portion of the apparatus is substantially cooler than the pad and even more condensation of the water vapor takes place on the lower surfaces of the apparatus. In this way the pad itself serves to divide the apparatus into an upper evaporating chamber and a lower condensing chamber. Moreover, as the sea water evaporates from the pad more sea water is supplied thereto by the wicks which feed water to the pad against the pressure of the air with which the apparatus is inflated.

As the pure water condenses and runs down into the bottom of the apparatus it passes through the nipple 34 to the collector 36. When sufficient pure water has been obtained in this manner the apparatus is raised from the sea with one hand by the lifting loop 38 and the collector is detached from the nipple with the other hand. The water thus obtained can then be poured out into a container for drinking or can be drunk directly from the collector.

In order to obtain more water the envelope need only be inflated again, the collector 36 again applied to the nipple and the apparatus then returned to the sea. As shown in Fig. 3 inflation of the apparatus generally produces a central depression in the top of the envelope where the cord 10 is attached. Water condensing about the central area of the upper section 2 of the envelope thus runs toward the cord 10 and the cord serves as wicking passing down through the pad 8 and support 12 to the bottom of the apparatus. In order to prevent contamination of the pure water passing down the cord by the sea water in the pad 8, the cord 10 preferably is coated with lacquer or otherwise provided with an outer water-proof shield which extends for some distance above and below the support 12.

In a similar way the supporting strings 14 and 16 may be provided with wicking 52 which surrounds the points 18 and 20 so that water flowing down the walls of the envelope cannot be contaminated by salt water from the strings 14 and 16. However, the strings preferably are saturated with a water repelling composition to prevent the flow of sea water from the pad to the walls of the envelope.

In order further to improve the operation of the apparatus and insure the maximum transmission of heat through the envelope to the evaporator pad, the inner surface of the envelope is preferably formed or provided with means to prevent fogging of the surface by the accumulation of droplets of moisture thereon. Thus, if the envelope is formed of resinous material it may be saponified or have a solution of polyvinyl alcohol in acetone or a conventional wetting agent or surface tension reducing material such as a sulfonated fatty acid, applied to the inner surface of sections 2 and 4. The moisture condensing on surfaces thus treated spreads out into a film and flows readily downwardly along the surface instead of remaining in drops thereon.

Further, in order to increase or facilitate the flow of sea water through the various wicks and spreading thereof throughout the evaporator pad, the wicks and pad may be provided with a wetting agent if desired.

As illustrated in Fig. 4, the apparatus also may be provided with a valve for preventing deflation of the envelope on removal of the collector 36 from the nipple 34. For this purpose a pad of wicking 56 is placed over the central opening 58 in the nipple 34 and a flexible strip 60 of resin, rubber or the like is crossed over the pad to urge it lightly toward the nipple. Liquid accumulating in the bottom of the envelope is thus conducted to the opening 58 and a string 62 extending downward in the opening causes the liquid to drip from the wicking 56 into the collector. The flexible strip 60 serves to prevent air from escaping through the opening when the collector is removed, whereas the strip is yieldable upward to permit ready inflation of the envelope when the user blows air into the nipple 34.

The construction illustrated in Figs. 1, 2 and 3 has been found to be very simple and inexpensive to produce and to be easy and fool-proof in operation. An apparatus of this type having an evaporator pad 20 inches in diameter is found to produce about a pint of fresh water or more a day. On the other hand, the apparatus can be folded and packed in a container measuring 2 x 4 x 6 inches.

With this apparatus no rigid framing elements or supports are required and support of the pad by distending of the envelope is accomplished solely by inflation of the envelope in which evaporation and condensation take place. However, if desired the seam 6 may be formed to provide a stiffening effect or short stiffening members may be located in or adjacent the seam and extend from one of the pad supporting strings to another.

These and other changes and modifications may be made in the form, construction and arrangement of the elements of the apparatus without departing from the spirit and scope of my invention. In view thereof it should be understood that the embodiments of my invention herein shown and described are intended to be illustrative only and are not intended to limit the scope of the following claims.

I claim:

1. In solar distillation apparatus an inflatable envelope adapted to float upon the surface of liquid to be distilled, an evaporator pad located within said envelope, said envelope having a transparent portion positioned to expose said evaporator pad to solar radiation through the transparent portion when the apparatus is floating upon the surface of liquid to be distilled, wicking connected to said evaporator pad and projecting through a wall of the envelope into position to contact liquid upon which the apparatus floats to conduct liquid to said pad, and means for restricting the opening in the envelope through which said wicking extends to an extent which will prevent the escape of air from the envelope while permitting flow of liquid through the wicking by capillary attraction.

2. Solar distillation apparatus comprising a single inflated transparent envelope with an evaporator pad suspended within the envelope out of contact with the walls of the envelope, wicking projecting through the lower wall of said envelope and having its upper end connected to said pad to supply the pad with sea water, means for preventing the escape of air from the envelope about said wicking, and means communicating with said envelope for collecting pure water distilled off from the sea water.

WILLIAM H. MILLER, Jr.